UNITED STATES PATENT OFFICE.

R. A. TILGHMAN, OF PHILADELPHIA, PENNSYLVANIA.

IMPROVEMENT IN DECOMPOSING ALKALINE AND OTHER SALTS.

Specification forming part of Letters Patent No. 5,383, dated December 4, 1847.

*To all whom it may concern:*

Be it known that I, the undersigned, RICHARD ALBERT TILGHMAN, of the city of Philadelphia, in the State of Pennsylvania, have invented a new and useful improvement called "an improved method of decomposing the sulphates and muriates of the alkalies and alkaline earths," of which the following is a full and exact description.

My invention consists in a method of decomposing the sulphates and muriates of the alkalies and alkaline earths by exposing them at a high temperature to a current of steam or vapor of water, by which the acid is carried off and the alkaline base either remains free or enters into combination with some third substance provided for that purpose.

To decompose sulphate of lime and obtain from it sulphuric and sulphurous acids and free lime, I proceed in the following manner: I have a fire-clay cylinder of close texture and of any convenient size placed vertically in a furnace, and provided with openings at the top and bottom for charging and discharging, which openings are capable of being closed air-tight. To the top of this cylinder I adapt an escape-tube of fire-clay for conveying off the acid-vapors, and to the bottom, for the admission of the steam, I adapt another clay pipe connected with a steam-boiler by a series of fire-clay tubes which are to be kept at a red heat. In order to diminish the corrosion of the cylinder by the sulphate of lime or the lime itself, I line it with a coating of native carbonate of magnesia applied in a similar manner to the usual clay linings of chemical furnaces. I fill the cylinder with pieces of sulphate of lime about a quarter of an inch in diameter, and having luted the openings air-tight, I heat the cylinder and its contents to a high red heat. I then pass steam from the boiler through the red-hot clay tube into the bottom of the cylinder and up through the charge. The heated steam, in its passage up through the pieces of sulphate of lime, carries off the acid in the state of sulphurous acid and oxygen, with sometimes a little sulphuric acid mixed with it. The acid-vapors pass off by the escape-tube at the top of the cylinder, and I convey them by stoneware tubes into a leaden chamber, in order to combine them into sulphuric acid by the usual means. I take care that the heat is not raised so high at first as to melt the sulphate of lime in the cylinder; but I increase it toward the end of the operation, the charge becoming more infusible when partly decomposed. I have an opening in the tube conveying off the acid-vapors from the top of the cylinder, by means of which I examine the vapors from time to time, and from the relative acidity of these, ascertained by the usual tests, I judge of the progress of the operation. I regulate by a stop-cock the quantity of steam passed through the charge in the cylinder, maintaining the supply at that point which produces the greatest quantity of acid in the vapors. When the vapors cease to contain any notable proportion of acid, the cylinder and its contents being at a high red or low white heat, I shut off the steam, withdraw the charge from the cylinder by the lower opening, and put in a fresh one to be treated like the first. The charge thus operated upon will be found to consist chiefly of caustic lime.

When I wish to obtain the acid and alkaline base from the sulphate of magnesia I first drive off by heat all its water. I then introduce it in small pieces into a cylinder, such as I have before described, and operate upon it in the manner directed for the sulphate of lime; but I take care to keep the heat at low redness at first to prevent the fusion of the charge, which would choke up the cylinder and prevent the passage of the steam. The decomposition of the sulphate of magnesia takes place at a much lower temperature than that of sulphate of lime (a low red heat is sufficient) and a considerable part of the acid is given off in the state of sulphuric acid. When the charge has been treated as directed the residue will be found to consist chiefly of caustic magnesia.

When I wish to decompose the sulphates of baryta and strontia I operate upon them in a reverberatory furnace. This mode is less advantageous for the manufacture of sulphuric acid than the use of the close cylinder formerly described; but I prefer it for the two last-mentioned salts, because I consider their bases the more important product of their decomposition, and the hydrates of these alkalies, and particularly that of baryta, being fusible, would have much tendency to corrode the interior of the cylinder at the heat necessary to decompose the salts.

I use a common reverberatory furnace with its hearth covered with a compact bed of native carbonate of magnesia three or four inches thick. Several clay steam-pipes are introduced through the roof of the furnace, so as to throw a current of heated steam over the whole width of the hearth. These pipes are connected with a steam-boiler by a series of fire-clay tubes kept red-hot. The sulphate, broken into pieces of about half an inch in diameter, is spread over the lining of carbonate of magnesia on the hearth of the furnace and brought to a high red or low white heat. A current of steam is then admitted from the boiler, through the red-hot tubes, upon the charge. The acid of the sulphate is carried off by the steam, and when I wish to condense it the acid-vapors are conveyed along with the gases of the fire into a leaden chamber to be combined into sulphuric acid by the usual means. The quantity of steam thrown upon the charge is kept at the point which produces the most rapid evolution of acid, and the charge is stirred occasionally, so as to expose fresh surfaces to the action of the steam. As the contact of deoxidizing-gases with the sulphate is injurious, I admit, if necessary, by suitable openings above the fuel, such an excess of air as will render the atmosphere in the furnace oxidizing. The sulphate of strontia requires a higher heat than the sulphate of lime for its decomposition, and the sulphate of baryta still higher than the sulphate of strontia. When the sulphate of baryta is partly decomposed the mass melts and becomes more fusible as the decomposition proceeds. I judge of the progress of the operation by testing a portion of the charge from time to time. When it dissolves altogether, or nearly so, in dilute nitric acid I withdraw the charge, which now consists chiefly of the hydrate of baryta or strontia.

To obtain muriatic acid and the hydrates of baryta or strontia or caustic lime from the muriates of those bases, I employ the same process as that above described for the decomposition of the sulphate of baryta. The sulphates of potash and soda may to some extent be decomposed by being subjected at a high temperature to the action of a current of steam in the manner directed for the decomposition of the sulphate of baryta; but, owing probably to the volatile nature of the bases of these salts at a high temperature, no large proportion of them can thus be obtained in a free state. To aid, therefore, the decomposing action of the steam I employ some substance capable, when mixed with these sulphates, highly heated and exposed to steam, of forming a combination with their alkaline bases which shall yet, when cold, give up the alkali to the action either of water or of water and carbonic acid. Of the large class of substances possessing these properties, which for convenience I will call "combining substances," I prefer to use either alumina or the subphosphate of alumina. The alumina is prepared by strongly igniting the sulphate of alumina, or by any other well-known process. The subphosphate of alumina is prepared (as is directed in chemical works) by mixing solutions of the phosphate of soda and the sulphate of alumina and adding to the solution a slight excess of ammonia. I mix the alumina in the state of powder with an equal weight of the sulphate of potash, or of soda also powdered, and spread the mixture upon the hearth of a reverberatory furnace, such as I have before described for the decomposition of the sulphate of baryta. The mixture is then heated, exposed to steam, stirred, and the operation conducted in all respects in the manner described for the treatment of the sulphate of baryta. When it is desired to collect the sulphuric and sulphurous acids produced by the decomposition of the sulphates of potash and soda, I prefer to moisten the mixture of alumina and the sulphate with water and form it into balls of about half an inch in diameter, which I heat and expose to steam in a close cylinder in the manner formerly described for the sulphate of lime. When a specimen of the charge shows by the usual tests that it contains no notable proportion of sulphate undecomposed, the operation is completed. I then withdraw the charge, lixiviate it with hot water, and when the clear solution of aluminate of potash or soda thus obtained has become cold I pass through it an excess of carbonic acid until no more precipitate of alumina is formed. The clear solution of carbonate of potash or soda is then drawn off and evaporated. The alumina thus recovered is again used as the combining substance.

When I wish to obtain the aluminate of potash or of soda I merely evaporate the solution above described without introducing the carbonic acid. The muriate of potash or of soda may also be decomposed, when in a fused state, by the action of steam, alumina, or the subphosphate of alumina being present. The operation is to be conducted in all respects in the same manner as that just described for the sulphates of potash and soda; but, owing to the great volatility of the muriates of potash and soda when exposed at a high temperature to a current of air or steam, a large quantity of the muriate will escape with the steam and gases of the fire in the state of vapor undecomposed, and will be lost, or will be difficult to condense. I prefer therefore to effect the decomposition of the muriates of potash and soda by causing their vapors, intimately mixed with highly-heated steam, to pass slowly through a mass of small pieces of alumina kept at a high red-heat. I use for this purpose a vertical fire-clay cylinder lined with a coating of native carbonate of magnesia to diminish the corrosion of its sides by the alkali, and made with convenient openings at top and bottom for charging and discharging, which openings should be capable of being closed air-tight. I arrange a cast-iron retort so that its tube enters directly the cylinder near its bottom. The retort should have a charging-door at the top capable of being made air-tight, through which is introduced the muriate of potash or soda to be decomposed.

The muriates of potash and soda will not vaporize freely, even when fused and highly heated, unless the atmosphere above them is continually changed. This may be effected by a current of steam, and I find that I can sufficiently regulate the quantity of the salt volatilized from the retort by the amount of steam which I blow over its melted surface. I therefore insert a small steam-pipe into the top of the retort, so as to throw a jet of heated steam upon the surface of the melted salt, and thus force its vapor to enter the cylinder. The quantity of steam thus introduced to aid the volatilization is not sufficient to decompose all the salt volatilized. The rest of the steam necessary for this purpose is passed directly into the cylinder by a fire-clay pipe entering it near the bottom, and connected through a series of fire-clay tubes, kept red-hot, with a steam-boiler. Both steam-pipes are provided with cocks. An escape-tube is inserted into the top of the cylinder to convey the acid-vapor and the vapor of any undecomposed muriate into suitable condensers. I have an opening in this tube, by which I can withdraw at times a portion of the vapors in it to examine their saline and acid character. The cylinder and retort are to be so constructed and arranged as to allow their contents to be heated to high redness and upward by any of the well-known means.

The mode of operating is as follows: The discharging-door being closed air-tight, I fill the cylinder with alumina in pieces of about one-quarter of an inch in diameter and fill the retort with the muriate of potash or soda, and then close both the charging-door of the cylinder and that of the retort air-tight. I now bring the cylinder to a high red or white heat and the retort to a cherry-red heat, so that the salt in it is melted and ready to volatilize freely on the admission of steam upon its surface. Steam is now passed from the boiler through the red-hot tubes into the cylinder by the pipe entering near its bottom, so that it is filled with highly-heated steam passing upward in a slow current through the interstices of the pieces of alumina. I now admit by degrees a jet of heated steam into the salt-retort by the pipe entering its top, and thus drive a quantity of salt-vapor into the cylinder, where it mixes thoroughly with the current of steam which has entered by the other pipe and ascends with it through the column of highly-heated alumina. In its passage the alkaline base of the muriate combines with the alumina, forming an aluminate of potash or soda, and the muriatic acid, together with any salt-vapor which may have escaped decomposition, passes off with the steam, through the escape-tube at the top of the cylinder, into the condensers provided.

The progress of the operation can be ascertained by examining the nature of the vapors which are passing through the escape-tube. When these vapors contain a large quantity of salt and are strongly acid at the same time I admit more steam through the pipe leading directly into the cylinder, and if this does not have the effect of diminishing the quantity of salt in the vapors, I lessen the quantity of steam thrown into the salt-retort, and by that means decrease the supply of salt-vapor driven into the cylinder. When the escaping vapors contain but little salt and a large quantity of acid I consider the operation as proceeding favorably, and I always endeavor to regulate the quantities of steam passed through the two pipes, and by that means the proportions of salt-vapor and steam thrown into the cylinder, so as to produce this effect. When the escaping vapors contain a large quantity of salt and steam and but little acid, the cylinder and its contents being at a high red heat, I consider that the decomposition of the salt is no longer effected in the cylinder, and I then shut off both currents of steam, withdraw the charge by the lower door, and replace it by fresh alumina. The withdrawn charge is then lixiviated with hot water, and the solution of aluminate of potash or soda thus obtained is treated with carbonic acid, as before described. The lining of the cylinder should be examined occasionally and kept in repair, so that the fire-clay may not be corroded by the alkali. Provided the charge of alumina in the cylinder is readily and equably permeable to the current of steam and salt-vapor, the smaller the pieces of which it consists and the greater the surface they expose to the current the more rapidly will the decomposition of the muriate proceed. The steam used need not be of a higher boiler-pressure than will suffice to secure its passage through the charge in the cylinder.

The subphosphate of alumina may be substituted for the alumina in the processes for the decomposition of the sulphates and muriates of potash and soda, and its action is even more powerful; but its first cost is greater. Although, to aid the decomposition of the sulphates and muriates of potash and soda by steam at a high temperature, the use of either alumina or its subphosphate is preferred as the combining substance, yet there are a great number of substances which also possess the requisite properties, but act with various degrees of energy. Thus many salts which already contain a certain proportion of base will yet, when exposed in contact with the sulphates and muriates of potash and soda at a high heat to the action of steam, form a combination with the potash or soda decomposable when cold by water or water and carbonic acid. The subphosphates of lime, baryta, and strontia and the subsilicates of lime, baryta, and strontia will under these circumstances combine with the alkali and yield it to the action of water alone when cold. The sulphates of baryta and strontia, although themselves decomposable by by the action of steam at high temperatures, are still capable of thus aiding in the decomposition of the sulphates and muriates of potash and soda, and yield the alkali by the action of water. The neutral phosphates and neutral silicates of potash and soda, when thus treated, form basic salts which are soluble in water and decomposable by carbonic acid. The alkalies, lime, and magnesia will also thus combine with a portion of free potash or soda, which may be extracted by water. Other materials are capable of being used as combining substances; but I have named those which I consider preferable.

The decomposition of the muriate of soda by the action of steam at a high temperature may be applied to the production of sulphate of soda by exposing the muriate, mixed with sulphate of lime, to a high heat and to the current of steam. For this process I use a horizontal cylinder of close fireware protected on the inside from the action of the lime or the sulphate by a lining of carbonate of magnesia, and provided with an opening for charging capable of being made air-tight. Into the top of the cylinder, at one end, a steam-pipe is introduced, and from the other end, at the top, an escape-pipe connects with suitable condensers for collecting the vaporized salt and acid. The cylinder is half filled with a mixture of equal parts, by weight, of sulphate of lime and muriate of soda, the opening made air-tight, and the cylinder and its contents brought to a red heat. A current of heated steam is then admitted, which passes over the surface of the melted mixture and carries off muriatic acid with more or less volatilized salt into the condensers. When the steam escaping from the cylinder ceases to contain any notable quantity of muriate acid the operation is discontinued and the charge is withdrawn. Its soluble salts are extracted by water and the sulphate of soda separated from any undecomposed muriate by evaporation and crystallization. In this operation the heat should not be raised so high as to cause the decomposition by the steam of the sulphate of soda produced on the sulphate of lime itself.

Though I prefer in all the above-described processes heating the steam highly before passing it upon the salt to be decomposed, yet the same effect will be produced whenever the steam and salt are in contact at the proper temperature for the respective decompositions whether they have both been previously heated or one alone heated so highly as to be able to raise the other to the required temperature. As has been before stated, some of the salts are decomposable by steam at a much lower temperature than others; but with all the decomposition proceeds move rapidly in proportion as the heat is increased.

I claim as of my invention—

1. The decomposing the sulphates of baryta, strontia, lime, and magnesia and the muriates of baryta, strontia, and lime by exposing them at a high temperature to the action of a current of steam for the purpose of obtaining the acids and the alkalies of these salts, respectively.

2. The decomposing the sulphates and muriates of potash and soda for the purpose of obtaining the acids and the alkalies of these salts, respectively, by exposing them at a high temperature to the action of a current of steam, alumina or other combining substance being present.

3. Making aluminates of potash and soda by the action of a current of steam upon a mixture of alumina and the sulphate or muriate of potash or soda at a high red heat.

4. The making sulphate of soda by the action of a current of steam upon the muriate of soda at a red heat, sulphate of lime being present, as described.

I testimony whereof I, the said RICHARD ALBERT TILGHMAN, hereto subscribe my name, in the presence of the witnesses whose names are hereto subscribed, on the 13th day of September, A. D. 1847.

RICHARD ALBERT TILGHMAN.

In presence of—
JOSEPH MARQUETTE,
WILLIAM EWING.
                *U. S. Consulate, London.*